United States Patent Office 3,657,448
Patented Apr. 18, 1972

3,657,448
METHOD OF CONTROLLING UNDESIRABLE FISH
Philip H. Derse, 3547 Topping Road,
Madison, Wis. 53705
No Drawing. Filed Sept. 22, 1969, Ser. No. 860,021
Int. Cl. A01n 23/00
U.S. Cl. 424—277         5 Claims

ABSTRACT OF THE DISCLOSURE

A method for selectively controlling certain undesired fish species which comprises causing said undesired fish species to be contacted with a small but toxic amount of the compound 2,3-dicyano-1,4-dithia-anthraquinone or suitable salts thereof.

---

This invention relates to and has for its objects novel methods of wildlife conservation. More particularly, this invention relates to novel methods of controlling certain undesirable species of fish and to compositions useful therefor.

In the recent past it has been found necessary in many instances, either for purposes of economics or conservation, to control certain species of fish. In some instances, bodies of water become overpopulated with one species of fish thereby endangering the continued existence of other more desirable species and also endangering the natural biological balance of the immediate environment. Many attempts have been made to restore the natural biological balance or to eliminate undesirable species of fish in favor of more productive or commercially desirable species.

Heretofore, there has not been an efficient method for controlling certain undesirable species of fish. One method which has been employed, where practical, involved the eradication of all species of fish in the body of water and the renovation and restocking thereof in conformance to the natural biological balance. This method, which of necessity must be restricted to small, easily manageable, bodies of water preferably man-made ponds, has not proven successful or widely accepted for economic reasons.

It has now been discovered that certain undesirable species of fish can be controlled by the novel methods of this invention and the compositions employed in the practice thereof. More particularly, it has been found that certain undesirable species of fish may be controlled by contacting said fish with a small but effective amount of a suitable composition comprising as its principal active ingredient the compound, 2,3-dicyano-1,4-dithia anthraquinone or suitable salts thereof; said principal active ingredient dispersed in a substantial amount of a suitable extending agent.

Among the undesirable fish species which may be controlled by the practice of this invention may be included inter alia such species as those of the families Siluridae, e.g. catfish; Salmonidae, e.g. trout, and other like species. Although it has been found that the amount of control will vary with each species, it has been found that very satisfactory results are obtained in the control of Siluridae.

In this disclosure and the claims appended thereto, the term, "dispersed' is used in its widest possible sense. When it is said that the compounds of this invention are dispersed it means that the particles may be molecular in size and held in true solution in a suitable solvent. It means further, that the particle may be colloidal in size and dispersed through a liquid phase in the form of suspensions or emulsions or in form of particles or droplets held in suspension by wetting agents. The term "dispersed" also means that the particles may be mixed with and read throughout a solid carrier so that the mixture is in the form of powder or dust. The term "dispersed" also includes mixtures which are suitable for use in aerosol containing solutions, suspensions or emulsions of the agents of this invention in a solvent or carrier, and a suitable propellent, such as a Freon which boils below room temperature at ordinary pressure.

The term "extending agent" as used in this disclosure and in the appended claims, includes any and all of those agents in which the compounds of the instant invention are dispersed. It includes, therefore, the solvents of a true solution, the liquid phase of suspensions, emulsions or aerosols, the semi-solid carrier and the solid phase of dust and powders. The extending agent must be one which will permit employment of the principal active ingredient in water.

It has been found that the compounds of this invention are active when dispersed in an extending agent at concentrations of 1.0% by weight or even lower. This concentration is effective when the dispersing agent is a liquid, but it is preferred to use more concentrated mixtures when the dispersing agent is a semi-solid or a solid. This is because liquid dispersions which are, of course, suitable for use as sprays give a more intimate contact with the area being treated than the solid dispersions and, therefore, lower concentrations are more effective with liquid dispersions.

There are a number of solvents which can be utilized for the preparation of solutions, suspensions or emulsions of the compounds of this invention. High boiling oils of vegetable origin such as castor oil or olive oil have been found to be suitable. Low boiling, more volatile solvents, for example ketones, such as acetone; alcohols, such as methanol and ethanol; aromatic hydrocarbons, such as benzene, toluene; and the like are also useful. For certain applications it may be advantageous to resort to mixtures of solvents.

If the active agents are to be applied as aerosols, it is convenient to dissolve them in a suitable solvent and to disperse the resulting solution in a gas such as a Freon which boils below room temperature. For such applications, it is better to employ true solutions of the active agent although it is possible to employ suspensions or emulsions of the active agent.

The agents of this invention are often dispersed either in the form of emulsions or suspensions, in an inert carrier with the aid of a capillary active substance. Such capillary substances may be anion-active, cation active or non-ionizing. There may be mentioned by way of example, natural or synthetic soaps, Turkey-red oil, fatty alcohol sulfates, esters of fatty acids and the like. Other examples include high molecular weight quaternary ammonium compounds as well as condensation products of ethylene and propylene oxide with alkyl phenols or monohydric alcohols.

For use as a powder or dust the active ingredients of this invention may be mixed with any of a number of extending agents either organic or inorganic in nature which are suitable for the manufacture of pulverulent preparations. In addition to mixing the ingredients directly, the active compounds of this invention may first be dissolved in a suitable solvent and the dry extending agents may be treated with the resulting solution so that after the solvent evaporates off, the active ingredient is effectively coated on the surface of the extending agent. The extending agents which may be employed include, for example, tricalcium phosphate, calcium carbonate, kaolin attapulgite, diatomite, dolomite, gypsum, pyrophyllite, montmorillonite, bentonite, bole, kieselguhr, talc, calcined magnesia, boric acid and others. Materials of vegetable origin such as powdered cork, soyabean flour, powdered tobacco, ground corn cobs, powdered wood and powdered walnut shells are also useful. These mixtures may be used in the dry form or, by the addition of wetting agents, the dry powder can be rendered wettable by water so as to obtain stable aqueous dispersions suitable for use as sprays.

In general, in the practice of this invention, the amount of the novel compositions of this invention which may satisfactorily be employed is that which will provide, in the environment or habitat of the fish being treated, a sufficient concentration of the principal active ingredient of said composition to control the undesirable species of fish without exercising any substantial effect or control over the desirable species of fish. It has been found that the most satisfactory results are obtained when the principal active ingredient of this invention is present in the habitat of the fish being treated in a concentration of from at least .03 part per million to about 5.0 parts per million. It has also been found that the temperature of the water being treated also exerts some effect upon the concentrations of active ingredient required to obtain satisfactory results. In general, slightly less amounts are required when the water being treated is at a temperature of below about 55° F. However, the variations caused by differences in water temperature are nominal and can be adjusted for by the worker skilled in the art.

The following examples are illustrative of the invention and should not be limitative thereof:

EXAMPLE 1

Bio-assay tests are made according to the standard procedure modified from American Public Health Association, American Water Works Association and Water Pollution Control Federation (1960) and the methods set forth and employed by the United States Department of the Interior, Bureau of Sport Fisheries and Wildlife, Bureau Circular 185 (June 1964). These tests are conducted on selected species of fish in a standard deionized water having incorporated therein the following ingredients:

| Ingredient: | Amount per liter, mg. |
|---|---|
| Calcium sulfate | 30 |
| Magnesium sulfate | 30 |
| Sodium bicarbonate | 48 |
| Potassium chloride | 3 |

To this standard water was added sufficient amounts of 2,3-dicyano-1,4-dithio anthraquinone to provide various concentrations as reported below. Goldfish, catfish and rainbow trout specimens were loaded into the respective tanks and were permitted to remain for specific times, at which checks were made on their respective survival rates, the results of which are tabulated in the tables set forth hereinafter: (Results are reported as number dead/number started.)

TABLE 1.—CATFISH

| Concentration (p.p.m.) | Exposure time (hours) | | | | | | | |
|---|---|---|---|---|---|---|---|---|
| | 0 | 16 | 24 | 40 | 48 | 64 | 72 | 96 |
| .00 | 0/4 | 0/4 | 0/4 | 0/4 | 0/4 | 0/4 | 0/4 | 0/4 |
| .02 | 0/4 | 0/4 | 0/4 | 0/4 | 0/4 | 0/4 | 0/4 | 0/4 |
| .04 | 0/4 | 0/4 | 0/4 | 2/4 | 2/4 | 2/4 | 2/4 | 2/4 |
| .16 | 0/4 | 4/4 | | | | | | |
| 2.56 | 0/4 | 4/4 | | | | | | |

TABLE 2.—RAINBOW TROUT

| Concentration (p.p.m.) | Exposure time (hours.) | | | | |
|---|---|---|---|---|---|
| | 0 | 24 | 48 | 72 | 96 |
| 0.00 | 0/4 | 0/4 | 0/4 | 0/4 | 0/4 |
| .009 | 0/4 | 0/4 | 0/4 | 0/4 | 0/4 |
| .02 | 0/4 | 0/4 | 0/4 | 0/4 | 0/4 |
| .04 | 0/4 | 0/4 | 0/4 | 0/4 | 0/4 |
| .04 | 0/4 | 0/4 | 0/4 | 2/4 | 2/4 |
| .16 | 0/4 | 0/4 | 4/4 | | |
| .16 | 0/4 | 0/4 | 3/4 | 4/4 | |
| .16 | 0/4 | 0/4 | 4/4 | | |

TABLE 3.—GOLDFISH

| Concentration (p.p.m.) | Exposure time (hours.) | | | | |
|---|---|---|---|---|---|
| | 0 | 24 | 48 | 72 | 96 |
| 0.0 | 0/4 | 0/4 | 0/4 | 0/4 | 0/4 |
| 1.0 | 0/4 | 0/4 | 0/4 | 0/4 | 0/4 |
| 2.0 | 0/4 | 0/4 | 0/4 | 0/4 | 0/4 |
| 3.0 | 0/4 | 0/4 | 0/4 | 0/4 | 0/4 |
| 4.0 | 0/4 | 0/4 | 0/4 | 0/4 | 0/4 |
| 4.0 | 0/4 | 3/4 | 4/4 | | |
| 4.0 | 0/4 | 0/4 | 0/4 | 0/4 | 0/4 |
| 5.0 | 0/4 | 0/4 | 0/4 | 2/4 | 4/4 |
| 5.0 | 0/4 | 0/4 | 0/4 | 4/4 | |
| 5.0 | 0/4 | 0/4 | 0/4 | 2/4 | 2/4 |

The foregoing results demonstrate that the test compound is an agent which selectively controls certain species of fish.

What is claimed is:

1. A method of selectively controlling undesirable fish species of the families Siluridae and Salmonidae, which comprises contacting said fish in their natural habitat with a toxic amount of the compound, 2,3-dicyano-1,4-dithiaanthraquinone, said compound present in a concentration of from 0.03 to 5.0 parts per million.

2. The method of claim 1 wherein the undesirable fish is catfish.

3. The method of claim 1 wherein the undesirable fish is trout.

4. The method of claim 1 wherein the undesirable fish is of the family Siluridae.

5. The method of claim 1 wherein the undesirable fish is of the family Salmonidae.

References Cited

UNITED STATES PATENTS

| 2,109,464 | 3/1938 | Cantrell et al. | 260—36 X |
| 3,152,953 | 10/1964 | Strong et al. | 424—121 |
| 1,728,216 | 9/1929 | Schirmacher et al. | 260—369 |

OTHER REFERENCES

Dictionary of Organic Cpds., Oxford Press, 1965, p. 259.

Pesticide Index, 2nd ed. (1963), p. 119.

ALBERT T. MEYERS, Primary Examiner

L. SCHENKMAN, Assistant Examiner